United States Patent
Gaukel

[11] Patent Number: 5,902,186
[45] Date of Patent: May 11, 1999

[54] INTERMEDIATE SHAFT ASSEMBLY FOR STEERING COLUMNS

[75] Inventor: Patrick D. Gaukel, Bronson, Mich.

[73] Assignee: Douglas Autotech Corp., Bronson, Mich.

[21] Appl. No.: 08/907,775

[22] Filed: Aug. 8, 1997

[51] Int. Cl.[6] .................. F16D 3/06; F16C 3/03
[52] U.S. Cl. .................. 464/162; 464/180; 464/183; 464/89
[58] Field of Search .................. 464/113, 162, 464/179, 180, 182, 183; 74/492; 280/777

[56] References Cited

U.S. PATENT DOCUMENTS

| | | |
|---|---|---|
| 1,892,037 | 12/1932 | Crews . |
| 2,174,223 | 9/1939 | Frauenthal . |
| 3,012,421 | 12/1961 | Cull . |
| 3,137,148 | 6/1964 | Kayser ............................ 464/183 |
| 3,146,612 | 9/1964 | Lorenz . |
| 3,373,630 | 3/1968 | Heurtebise . |
| 3,412,628 | 11/1968 | DeGain . |
| 3,504,567 | 4/1970 | Susumu Ohashi et al. . |
| 3,808,838 | 5/1974 | Bowen et al. . |
| 3,850,049 | 11/1974 | Adams, III . |
| 3,878,695 | 4/1975 | Pitner . |
| 4,033,020 | 7/1977 | Hudgens ............................ 464/162 |
| 4,183,258 | 1/1980 | Stephan . |
| 4,304,147 | 12/1981 | Linnemeier . |
| 4,312,430 | 1/1982 | Ohtani . |
| 4,322,062 | 3/1982 | Aleck . |
| 4,479,786 | 10/1984 | DeBisschop . |
| 4,667,530 | 5/1987 | Mettler et al. ............................ 464/162 |
| 4,714,450 | 12/1987 | Byrnes et al. . |
| 4,772,245 | 9/1988 | Readman et al. . |
| 4,983,143 | 1/1991 | Sekine et al. ............................ 464/89 |
| 5,085,289 | 2/1992 | Chance . |
| 5,086,661 | 2/1992 | Hancock . |
| 5,243,874 | 9/1993 | Wolfe et al. . |
| 5,259,818 | 11/1993 | Kachi et al. . |
| 5,366,413 | 11/1994 | Yamaguchi . |
| 5,460,574 | 10/1995 | Hobaugh ............................ 464/162 |
| 5,511,823 | 4/1996 | Yamaguchi . |

FOREIGN PATENT DOCUMENTS

| | | |
|---|---|---|
| 2391390 | 1/1979 | France . |
| 2847541 | 5/1980 | Germany . |
| 3-288041 | 12/1991 | Japan ............................ 464/180 |
| 4-60235 | 2/1992 | Japan ............................ 464/180 |
| 4-107340 | 4/1992 | Japan ............................ 464/180 |
| 0959828 | 6/1964 | United Kingdom . |
| 2057632 | 4/1981 | United Kingdom . |
| 2070737 | 9/1981 | United Kingdom . |

*Primary Examiner*—Eileen Dunn Lillis
*Attorney, Agent, or Firm*—Miller, Johnson, Snell & Cummiskey, P.L.C.

[57] ABSTRACT

A steering column assembly comprising an outer isolator tube closed at one end and open at an opposite end; at least one tubular resilient member concentrically disposed within and adhered to an inner wall of the outer isolator tube; and an inner isolator tube concentrically disposed within and adhered to an inner wall of the resilient member, the inner isolator tube member having one end extending from the open end of the outer isolator tube. A telescoping shaft insert assembly is provided having a first end concentrically received within an inner wall of the inner isolator tube and with an opposite end of the telescoping shaft assembly from the open end of the outer isolator tube. The tubular resilient member disposed between the outer and inner isolator tubes is preferably made from a polymeric material and absorbs or dampens transient noise and vibration produced by the road and sensed at the steering wheel. This results in reduced fatigue for the operator. The steering characteristics of the vehicle can also be altered by changing the hardness and elasticity of the resilient members. Additional structure is provided to absorb crash energy and reduce the risk of injury to the operator from impacts with the steering wheel.

23 Claims, 4 Drawing Sheets

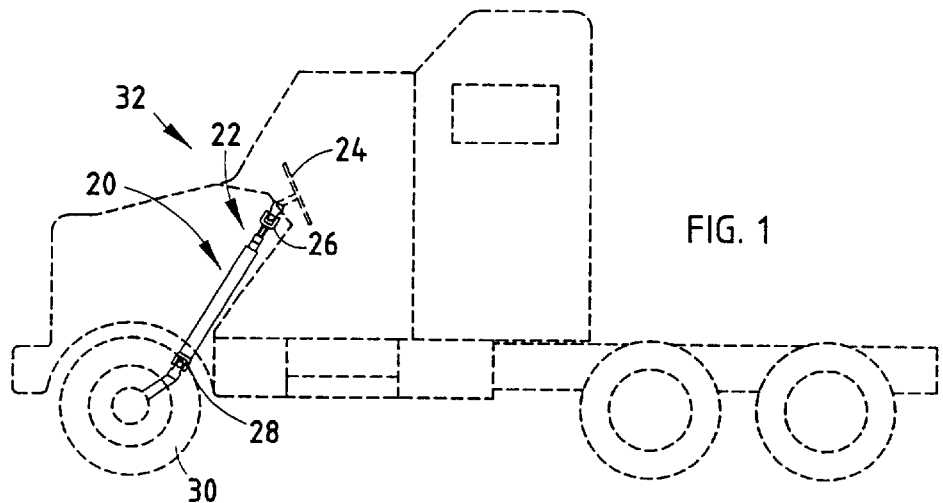
FIG. 1
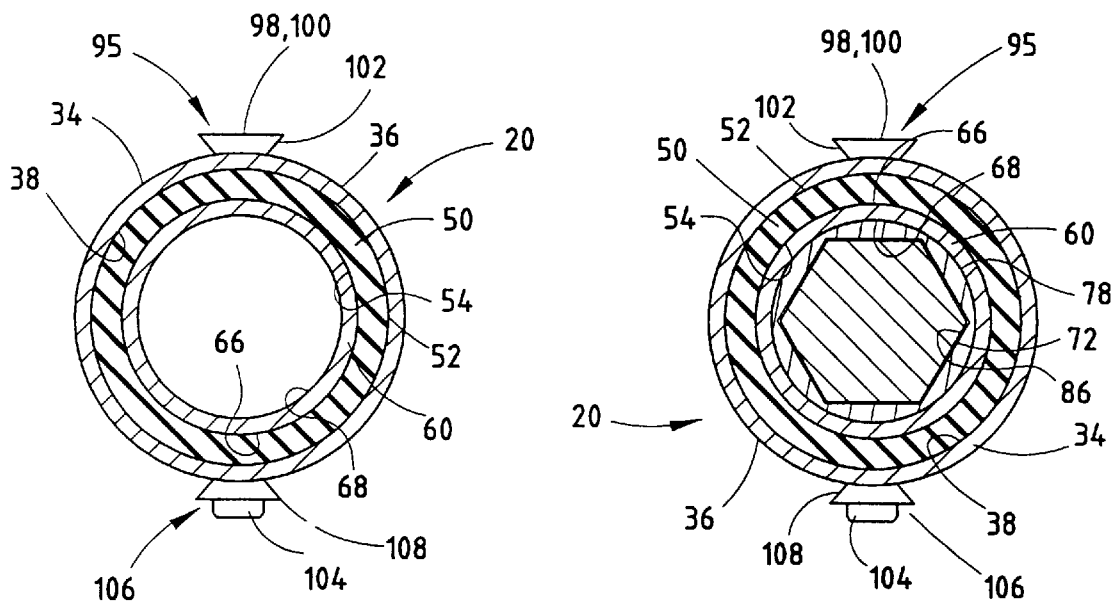
FIG. 6
FIG. 7
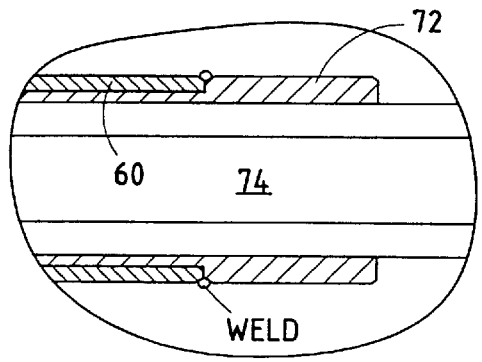
FIG. 8

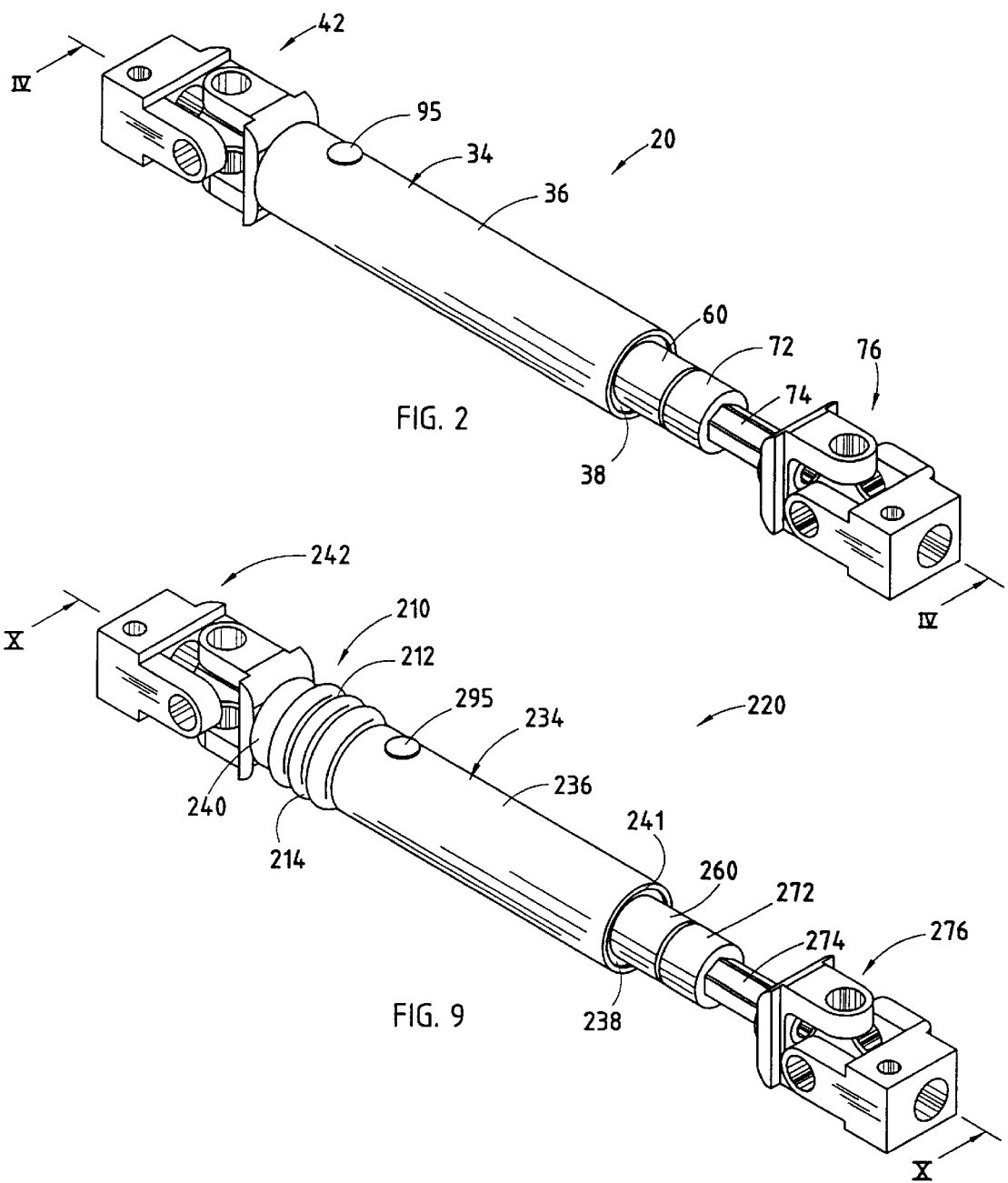

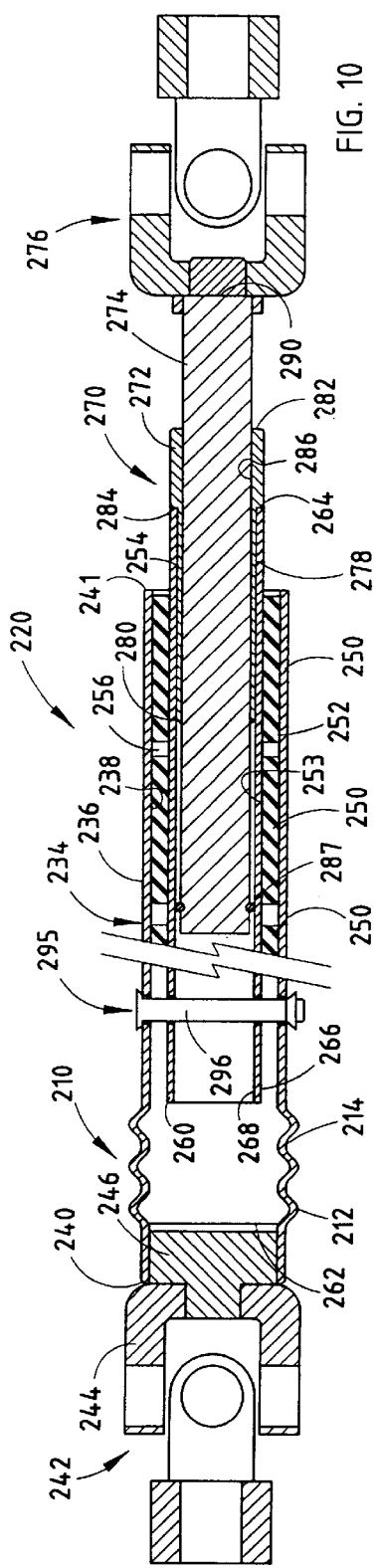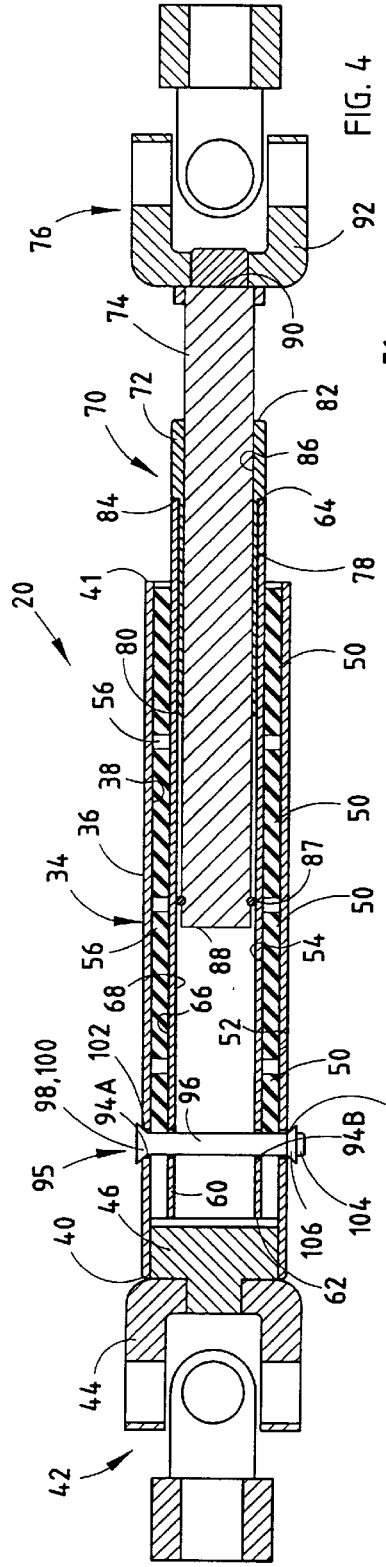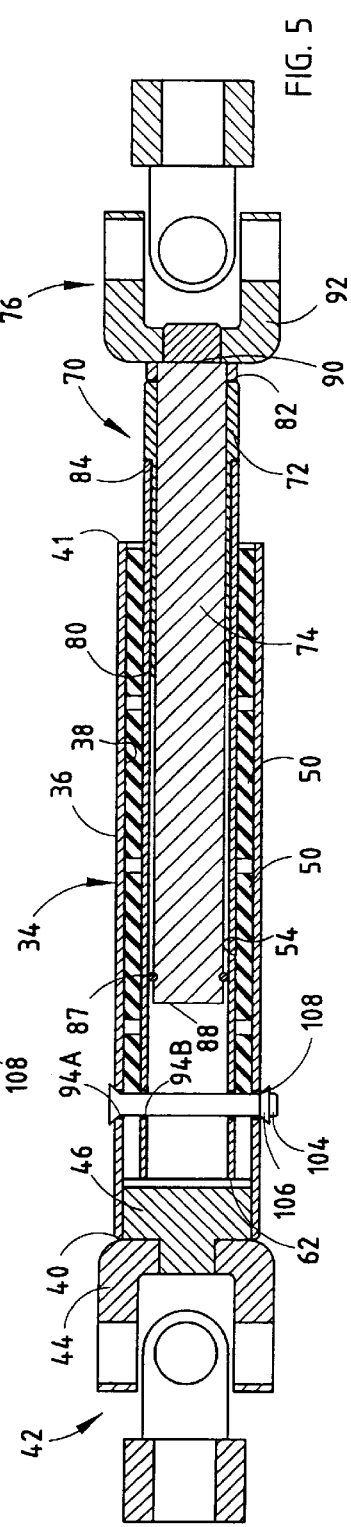

INTERMEDIATE SHAFT ASSEMBLY FOR STEERING COLUMNS

BACKGROUND OF THE INVENTION

1. Field of the Invention

This invention relates generally to steering column assemblies and particularly to an intermediate shaft for a steering column which offers reduced backlash and vibration and improved lateral stability than prior designs.

2. Discussion of the Related Art

Steering wheels of automobile and other vehicles are, in most cases, connected by one or more serially arranged shafts from the steering gear box to the steering wheel of the vehicle. In the early designs, a single solid shaft was connected at one end to the steering gear and at the other end to the steering wheel. Later designs incorporated one or more universal joints for routing the shaft from the steering wheel to the steering gear. It was found that solid steering column shafts presented a significant danger to drivers.

In later designs it was common to connect the steering wheel to the steering gear by a pair of tubular, concentrically positioned members which could telescope relative to one another, but were fixed rotationally. The tubular members had interconnecting end portions to permit rotation or transfer of torque from the steering wheel to the steering gear. However, these designs present substantially the same danger as prior designs because the telescoping distance was short in comparison to the shaft assembly. Moreover, as in the previous designs, the shaft transmitted vibrations produced by the road and engine to the steering wheel, producing numbness and fatigue in the operator's hands. Additionally, the interconnection of the tubular members created substantial backlash or nonresponsiveness in the steering wheel due to the gap between the concentrically arranged tubes.

U.S. Pat. No. 5,243,874 illustrates a more recent structure for use in steering columns. A pair of telescoping members are provided having a preselected cross-sectional configuration that facilitates the insertion of one tubular member in the other. The surface configuration of the interconnecting portions is complementary to prevent rotation of one with respect to the other. The outer surface of the internal member is spaced from the inner surface of the outer member forming an annulus which receives a thermosetting resinous material injected therein at an elevated temperature. The thermosetting resin shrinks upon cooling to form a sleeve having a cross-sectional area less than the annulus to permit telescopic movement of the inner tube. The disadvantage of the construction is the substantial backlash which exists as a result of the shrinkage of the resin. Another problem is the need to maintain the concentric orientation of the inner tube with respect to the outer tube during the injection step so the inner tube does not become eccentric with the rotational axis.

SUMMARY OF THE INVENTION

The intermediate shaft assembly of the steering column in one embodiment of the invention includes an outer tube having an outer wall and an inner wall, and an inner tube having a first end concentrically disposed within the inner wall of the outer tube, the inner tube having an outer wall and an inner wall. At least one, and preferably several resilient tubular members are disposed within the outer tube and receive the inner tube therein to position the inner tube within the outer tube. A shaft insert assembly, having a first end, is concentrically disposed within the inner wall of the inner tube and has a second end which extends from the second end of the inner tube. The intermediate Shari assembly is mounted in the steering column by universal joints, a first universal joint being attached to the first end of the outer tube, and a second universal joint being attached to the second end of the shaft assembly. A mechanical bond attaches the outer tube and the inner tube to the resilient tube in substantial fixed relationship. The substantial fixed relationship of the two tubes is aided by the fact that the outside diameter of the resilient tube is slightly greater than the inside diameter of the outer tube, and the inside diameter of the resilient tube is slightly less than the outside diameter of the inner tube, such that when placed concentrically within each other, fit in close relationship. The mechanical bond between the respective tube members substantially locks them in place.

In another form of the invention, the outer tube includes a collapsible section intermediate the first and second ends. The collapsible section defines a predetermined area of weakness or failure point in the outer tube such that upon an impact, the outer tube collapses or folds in the collapsible section and substantially eliminates the transfer of forces longitudinally along the intermediate shaft.

In yet another form of the invention, the concentrically arranged tubes interconnected by the resilient tubular members have a pin extending transversely therethrough for the purposes of providing a redundant coupling in the event the adhesion with either of the tubular members fails.

The intermediate shaft embodying the instant invention offers several advantages over the prior designs, including substantially reduced backlash about the longitudinal axis of the intermediate shaft as well as improved lateral stability of the inner tubular member. Moreover, the inner tube is concentric with the outer tube and the chances of eccentricity are significantly reduced. The shaft insert assembly is dimensioned such that a reduction in the overall length of the intermediate shaft of approximately 40 is available to absorb impacts. The crumple zone in the outer tube further reduces the risk of injury from impact forces transferred along the axis of the intermediate shaft.

The advantages and improvements over the prior designs set forth above will be better understood from a reading of the detailed description when taken in combination with the attached drawing figures, wherein:

BRIEF DESCRIPTION OF THE DRAWING FIGS.

FIG. 1 is a schematic diagram illustrating one application of the intermediate shaft assembly embodying the invention;

FIG. 2 is an isometric diagram of one form of the invention;

FIG. 4 is a longitudinal cross-section of the invention taken along line IV—IV shown in FIG. 2;

FIG. 5 is a longitudinal cross-section of the invention shown in FIG. 4 in a collapsed configuration;

FIG. 6 is a transverse cross-section of the invention;

FIG. 7 is another transverse cross-section of the invention

FIG. 8 is an enlarged fragmentary cross-section of a portion of the invention;

FIG. 9 is an isometric view of a second embodiment of the invention; and

FIG. 10 is a longitudinal cross-section of the invention taken along line X—X shown in FIG. 9.

DETAILED DESCRIPTION OF DIFFERENT EMBODIMENTS

Figure 3:
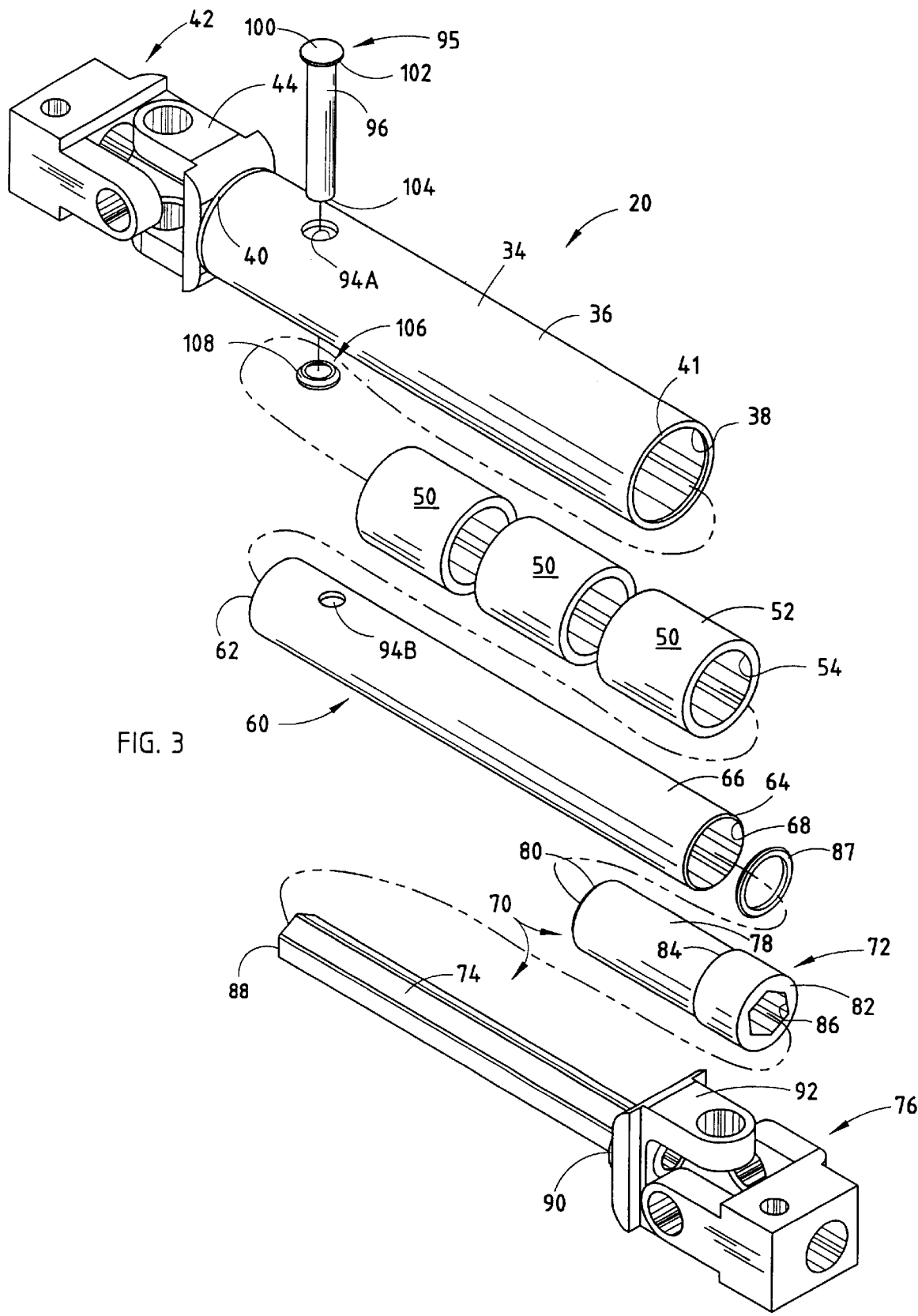
FIG. 3 is an exploded view of the invention shown in FIG. 2.

The following description will describe an application of the invention for use in automobiles. However, the invention has applications elsewhere, including rotary actuators or drive assemblies. Accordingly, FIG. 1 illustrates a shaft assembly 20 which may form an intermediate component in a steering column 22, which includes a steering wheel 24 at one end and a steering gear box 28 at an opposite end. The steering gear box 28 in turn is interconnected to the wheels 30 of the vehicle 32.

One embodiment of the shaft assembly 20, shown in greater detail in FIGS. 2–6, includes an outer isolator tubular member 34 having a cylindrical outer wall 36 and a cylindrical inner wall 38. The length of the outer member 34 may range between one and six feet, depending upon the application. The outside diameter of wall 36 may also vary, ranging from 1.5 inches to more than 4 or 5 inches. The inside diameter of wall 38 may also vary, but in a preferred embodiment is about 0.25 inch to about 0.75 inch less than the outside diameter, except in certain circumstances as will be described more fully below. The outer member 34 is preferably made from a rigid material such as steel, although aluminum alloys and bronze may also be suitable. It is also contemplated that composite materials may also be used, including certain wrapped laminates and/or carbon composites. Member 34 is preferably a right circular cylinder open at each end 40 and 41.

Attached to the first end 40 of member 34, and at least partially received within the cylindrical inner wall 38, is a coupler 42 configured to interconnect end 40 of the shaft assembly 20 and another portion of the steering column 22. In the preferred embodiment, the coupler 42 is a universal joint having a yoke 44 rigidly coupled to a base 46 which is welded or otherwise rigidly attached to the inner wall 38 and end 40 of outer member 34. The attachment of the coupler or universal joint 42 to end 40 of the outer member is preferably a permanent type of attachment such that one half of the coupler 42 becomes an integral part of outer member 34 and closes end 40.

Disposed within cylindrical member 34 and concentric with the longitudinal axis LA of the outer member 34 is at least one, preferably at least two, and most preferably four to five cylindrical tubular resilient members 50, each having an outer wall 52, an inner wall 54, and having a combined length less than the overall inside length of the outer member 34. In the embodiment shown, a plurality of resilient members or isolator elements 50 are provided, each made from a polymeric material such as rubber, PVC, polyurethane, or the like. The hardness of each of the resilient members 50 may range between a durometer of 40 and 95, depending upon the particular characteristics to be achieved. Each of the isolator elements 50 has an outside diameter at least equal to and preferably slightly greater than the inside diameter of inner wall 38 such that each of the isolator elements are firmly held within the outer member 34. In the preferred embodiment, the isolator elements 50 are arranged within the outer tubular member 34 in spaced tandem arrangement, each concentric about the longitudinal axis LA of the outer member 34. It is further contemplated that substantially no gap will exist between the outer wall 52 of the resilient isolator member 50 and the inner wall 38 of the outer member 34. Most preferably, each of the resilient isolator members 50 is slightly compressed so they are elongated longitudinally in order to be received within outer member 34. The space 56 between adjacent resilient isolator members 50 should be at least sufficient to permit the necessary longitudinal elongation. The space between adjacent isolator elements 50 may be a fraction of an inch, preferably at least about one-eighth of an inch and as large as three-quarters of an inch, most preferably about three-eighths of an inch.

Disposed within and extending through substantially all of the isolator elements 50 and concentric with the longitudinal axis of the outer member 34 and elements 50 is a cylindrical inner tubular member or inner isolator tube 60 having a first end 62 adjacent base 46 and a second end 64 extending out from the second end 41 of the outer tubular member 34 and beyond the isolator elements 50. The inner member or isolator inner tube 60 is preferably in the form of a right circular cylinder and includes a cylindrical outer wall 66 and a cylindrical inner wall 68. The diameter of cylindrical wall 66 is substantially equal and preferably slightly greater than the inside diameter of each isolator element 50 such that the inner member 60 is securely retained within the outer member 34 by the resilient isolator elements 50. The inner member 60 is preferably made from the same type of material as the outer member 34, including metal, polymers, and alloys or composites used to form the outer member 34. The nature of the material forming the resilient members 50, combined with the combined surface area contacting the inner member 60 and the outer member 34 provides a high friction, substantially rigid coupling between the three components. Each of the resilient members 50 may be slid onto the outside diameter of inner member 60 and moved to the appropriate location. In such an embodiment, it is contemplated that the inside diameter of each resilient member 50 is slightly less than the outside diameter of the inner member 60 so that the resilient members 50 do not slide freely thereon. To ensure that the plurality of resilient elements securely retain inner member 60 with respect to the outer member 34, an adhesive or lubricant may be applied to the inside wall 38 of the outer member 34 and the outside wall 52 of each of the resilient members 50 and to the inside wall 54 of the resilient members 50 and the outside wall 66 of the inner member 60. As mentioned above, the adhesive acts as a lubricant in the assembly of the respective elements. The adhesive (not shown) may be any one of a number including those selected from the groups of thermoplastics, thermoset components, epoxies, acrylics and polyesters and may cure to a hard or glassy phase, but preferably should remain somewhat resilient. The adhesive may also contain a lubricant such as an ultra high molecular weight polyethylene, graphite, silicone, or other material which serves to lower the coefficient of friction. If a lubricant alone is used, it may be applied to the outer diameter of the resilient members to aid in assembly. Once the isolator is assembled, the lubricant dissipates or evaporates, creating a very high static friction condition or mechanical bond. The lubricants may be any of a number including greases and oils and the like comprised of various compound bases such as petroleum or synthetic-based lubricants. In a preferred embodiment, the lubricant should be compatible with the material comprising the resilient members, and have a substantially high vapor pressure so that the lubricant may evaporate rather rapidly or be absorbed by the resilient members once the lubricant has served its lubricating purpose. The evaporation or absorption of the lubricant creates a high friction contact between the resilient member and the outer member. It is anticipated that a lubricant having a low surface tension would be preferred such that the lubricant could evaporate or be driven from the assembly once completed. What is desired is to create a high coefficient of friction between the members 34, 60 and the resilient members 50 once assembly is complete. Moreover, the type of adhesive or lubricant selected should be compatible and appropriate for bonding or adhering structures of different or dissimilar composition. For the purposes of this discussion and the drawing figures, the mechanical bond of the outer member and the inner member to the resilient elements has not been shown for the purposes of maintaining clarity to the drawing figures.

In an alternative embodiment, each of the resilient members 50 may be formed in-situ around the inner member 60. For example, each resilient member 50 may be molded about the inner member 60. Acceptable molding techniques include injection molding, compression molding, pour molding or casting. Extrusion may also be possible provided the elastomeric or polymeric material is sufficiently viscous. By forming the resilient members 50 on the inner member 60, a good strong bond can be achieved. Better adhesion can be attained by first treating or priming the outer diameter of the inner member 60 prior to forming of the resilient members.

Received within the inner member 60 through end 64 and concentric with the longitudinal axis of the outer member 34 is an insert assembly 70 which couples the opposite end of the shaft assembly to the other components of the steering column 22. The insert assembly 70 includes an insert 72, a shaft 74, and a second universal joint or coupler 76. The insert 72 is preferably made from high strength materials such as metals and certain polymers or composite structures and has an outer wall 78 which is substantially cylindrical in shape from a first end 80 to an opposite end 82. The outside diameter of wall 78 from end 80 to a shoulder 84 proximate end 82 is slightly less or generally equal to the inside diameter of cylindrical inner wall 68 such that the portion of insert 72 from end 80 up to the shoulder 84 is received by inner cavity 68 of the inner member 60. The outside diameter of wall 78 between shoulder 84 and end 82 is substantially equal to the outside diameter of cylindrical outer wall 66 of the inner member 60. Shoulder 84 is inclined to define a valley or space between the end 64 of the isolator inner tube and the insert 72. In one embodiment, insert 72 is rigidly attached to inner member 60 by welding shoulder 84 to end 64. In an alternative arrangement, shoulder 84 may also include one or more bosses or keys (not shown) spaced radially about on wall 78 which correspond to recesses or slots (also not shown) formed in end 64 of tube 60 which serve to rotationally lock insert with respect to inner member 60. Other mechanical devices such as threaded coupling, screws, pins and cams may be used to interconnect the insert 72 longitudinally with inner member 60. Additionally, a suitable adhesive may be used to bond the outer wall 78 between end 80 and 84 with the inside wall 68 of the inner isolator tube 60.

Insert 72 includes a tubular passage 86 to receive shaft 74 therein. In a preferred embodiment, the inner tubular passage 86 is not cylindrical, but rather polygonal and is concentric with the longitudinal axis of the outer member 34. For example, passage 86 may be square, pentagonal, hexagonal, septagonal, or octagonal in cross-section. Most preferably, passage 86 is hexagonal and extends from end 80 and out through end 82 of the insert. The dimensions of the passage 86 are generally the same or slightly larger than the outside diameter of shaft 74 received therein. As shown in FIGS. 3 and 7, shaft 74 is polygonal, and most preferably hexagonal, and includes a first end 88 which is received through end 82 of the insert and extends out beyond end 80. A second end 90 of the shaft 74 is attached to the coupler 76, and most preferably a yoke 92 of a universal joint. In a similar fashion, shaft 74 is preferably made from a high strength material, preferably steel. Hexagonal shaft 74 is free to telescope in and out of the tubular passage 86 with respect to insert 72 to permit longitudinal flexibility and adjustability to intermediate shaft assembly An O-ring 87 is disposed along shaft 74 proximate end 88 to act as a spacer between shaft 74 and the inner wall 68 of inner tubular member 60 and dampen any bending moments in shaft 74 up to resonance damper 87 produced by resonance vibrations most preferably the distance along the inner wall 38 from base 46 to a point just inside end 80 of insert 72, or the maximum distance the design permits. The primary purpose of the telescopic action is to absorb and compress upon impact to lessen the chance of injury to the operator. Although longitudinal flexibility is provided, rotational motion with respect to insert 72 and inner and outer tubes 60 and 34 is strictly minimized by the flat surfaces on shaft 74 engaging corresponding flat surfaces on the wall of passage 86. In a preferred embodiment, tolerances between the shaft 74 and passage 86 are about 0.002 inch to strictly minimize backlash.

Proximate end 40 of the outer isolator tube 34 and extending transversely through the walls 36 and 38 of the outer member 34 and the walls 66, 68 of the inner member 60 are a series of holes 94A and 94B, respectively. The location of the holes on each of the respective elements is such that they are aligned to permit passage of a safety backup pin 95 entirely through the outer isolator tube 34. The safety backup pin includes a shaft 96, one end 98 of which terminates in a head 100 having a tapered surface 102. The opposite end 104 extending through the opposite side of the outer isolator tube 34 is configured to receive a self-centering alignment washer 106 having a tapered surface 108. The alignment washer is retained on shaft 96 by mechanical means, including cotter pins, riveting and the like. The tapered surfaces 102 and 108 face inwardly to engage the holes within the outer isolator tube and center the backup pin within the holes to prevent chafing or abrasion of the pin shaft 96 against the various respective tubular elements. Abrasion of the shaft is also reduced by producing holes 94A and 94B with a larger diameter than that of shaft 96.

In operation, the shaft assembly 20 is assembled as shown in the drawing figures and attached to the steering column at both ends by the universal joints 42 and 76. The telescoping nature of shaft 74 within insert 72 and inner isolator tube 60 permits flexibility in adapting the shaft assembly 20 to various steering column arrangements. In a preferred embodiment, the shaft assembly is designed such that the shaft is substantially in the extended configuration for reasons which will become apparent below. As the steering wheel is turned or rotated, these rotational forces are transferred through the steering column and universal joint 76 to shaft 74. The hexagonal or polygonal nature of shaft 74 within the inner tubular wall 86 of the insert 72 transfers the rotational force to inner member 60 and across the resilient isolator elements 50 to the outer member 34. These rotational forces are then transferred from the outer member 34 to the universal joint 42 coupled at the end 40 to the opposite end of the steering column. Road and engine vibration and other transient forces migrating up the steering column are substantially dampened and removed from the steering column by the resilient isolator members 50 disposed between the outer member 34 and the inner member 60. As a result, less vibration is sensed by the operator at the steering wheel causing less fatigue than in prior devices.

The handling characteristics of the vehicle can be adjusted by changing the hardness of the isolator elements 50. For example, a very responsive shaft is achieved by using a high durometer hardness polymeric material for the isolator elements 50. The higher durometer hardness materials have a higher modulus of elasticity and are more efficient in the transfer of rotational forces, producing a quick transfer response from the steering wheel to the steering gear box. Alternatively, a softer response can be obtained by using a lower durometer hardness polymeric material with a relatively lower modulus of elasticity.

An important aspect of the invention is the safety backup pin 95 extending through the respective tubular elements. In the event that the resilient isolator elements 50 separate from one or both of the members 34 and 60, control of the vehicle is not lost since any rotational force transferred from the shaft 74 to the member 60 will be transferred to the outer member 34 by the shaft 96 of the safety backup pin 95. The gap between the safety backup pin 95 and the holes 94A–94B is sufficient to accommodate any rotational flex between the inner member and the outer member. Another important aspect of the invention is the reduced risk of injury to the operator as a result of transfer of impact forces longitudinally along the steering column shaft to the steering wheel. In a crash situation, the intermediate shaft assembly 20 collapses and absorbs the crash energy through the telescopic nature of the hexagonal shaft 74 in the insert 72. When installed, the shaft 74 is substantially extended with respect to the insert 72, permitting substantial translation of the shaft within the outer tube 34. Additional safety features are shown in an alternate embodiment of the invention described below.

In the alternate embodiment of the invention, shown in FIGS. 9 and 10, the intermediate shaft assembly 220 includes an outer tubular member 234 preferably in the form of a right circular cylinder and having an outer wall 236 and an inner wall 238. The member 234 is open at both ends, identified as first end 240 and second and opposite end 241, and may have a length ranging from several inches to more than six feet, depending upon the particular application. The cylinder 234 proximate end 240 is crenulated, identified by reference numeral 210, having annular ridges 212 and valleys 214. The bellows or crenulations 210 are formed preferably by hydroforming, a process wherein fluid under pressure is used to deform and conform the tube to the shape of a mold. In the forming process, the thickness of the cylinder walls is reduced in the area of deformation, producing a preferred zone of weakness along the cylinder. The zone of weakness produces a failure zone where the cylinder 234 will fracture to absorb energies produced by a collision or crash. As in the previous embodiment, member 234 is made from a substantially rigid, high strength material such as steel, although other materials may be found suitable for use. End 240 of the cylinder 234 is closed by the base attached to one portion 294 246 of a universal joint or coupler 242 which has been welded thereto, while the opposite end 241 is open to receive the various components described below.

Within tubular member 234 and arranged concentrically immediately adjacent inner wall 238 is at least one, and preferably more than two, resilient and polymeric members 250. Each member 250 is preferably a right circular cylinder having an outer wall 252 in intimate contact with the inner wall 238 of the tubular member 234. The resilient members 250 also include a concentric and longitudinal passage or inner wall 253. In a preferred embodiment, the resilient members 250 are located within tubular member 234 at a point intermediate crenulations 210 and end 241. In the case of multiple resilient members 250 within the tubular member 234, it is preferred that a space 256 exists between adjacent resilient members to permit elongation of the resilient members, as will become more apparent below. As in the previous embodiment, the resilient members 250 are preferably made from a polymeric material such as rubber, PVC, polyurethane, or the like. The hardness of the resilient members may have a wide range as earlier specified. With respect to the tolerance between the outside diameter of the resilient members 250 and the inner wall 238 of the tubular member 234, it is contemplated that substantially no gap will exist as the outside diameter of the resilient member is slightly greater than the inside diameter of the wall 238 prior to positioning the resilient members 250 within the tubular member 234. Each of the resilient members 250 is slightly radially compressed in order to place the resilient members 250 in the outer member 234. As a result of the compression, each of the resilient members 250 becomes elongated longitudinally. When in place, the tendency of the resilient members 250 to assume their original shape results in intimate contact of the outer wall 252 with the inner wall 238. In a preferred embodiment, an adhesive or lubricant, having lubrication characteristics in its viscous state, is used to assist in the location of each of the resilient members within the tubular member 234. After sufficient time has passed, the mechanical bond is created and rigidly secures the resilient member 250 in place. It is contemplated that the inner wall of tubular member 234, and/or the outer wall 252 of resilient member 250 may need to be pretreated or primed in order to complete the bond between the respective elements.

Each of the resilient members 250 is concentrically received along the longitudinal passage 254 of an inner tubular member or isolator tube 260 having a first end 262 located proximate and just short of the crenulations 210 and a second end 264 extending out from the end 241 of tubular member 234 and beyond the end of the last resilient member 250 contained by tubular member 234. The inner tubular member 260 is preferably in the form of a right circular cylinder and has a cylindrical outer surface 266 and a concentric cylindrical inner passage 268. The diameter of the cylindrical outer surface 266 is substantially equal to and may be slightly greater than the inside diameter of the longitudinal passage 254. If the diameters are different, the inner member 260 produces further compression and longitudinal elongation of each of the resilient members 250 such that a much greater surface area, both along the inner wall $^2$54 and the outer wall 252, respectively, of the resilient members 250, are in contact with the outer and inner tubular members 234 and 260. As a result, the inner member 260 is securely retained and held in place by the resilient members 250. The mechanical bond, mentioned above, may also be used to substantially fix and make more rigid the coupling between the inner tubular member 260 and the inner passage of the resilient members 250. The adhesive or lubricant, preferably applied to the inner tubular passage 254 and the outside surface 266, serves initially as a lubricant to assist in the insertion of the inner member 260 into the inner passage 254 of each of the resilient members 250. Thereafter, the mechanical bond is created and securely locates the inner member 260 therein. In particular, the preferred adhesive or lubricants may be one selected from the group identified above. However, in a preferred embodiment, the resilient members 250 are molded around the inner member 260 in the manner described above.

Substantially received within the cylindrical inner passage 268 from end 264 is a generally cylindrical insert 272 having a first end 280 within the inner member 260 and a second opposite end 282 extending from inner member 260. The insert 272 is only partially received within inner member 260, the depth controlled by a shoulder 284 formed in the outer cylindrical surface 278. Shoulder 284 is located proximate end 282 and defines a transition from a diameter which is received within the inner cylindrical passage 268. The outside diameter of the cylindrical wall 278 between shoulder 284 and the second end 282 is substantially equal to the outside diameter of the wall 266. The insert 272 is preferably rigidly fastened to the end 264 of the inner tubular member 260 by welding the shoulder 284 to the second end 264. The welding of the two components prevents rotational and translative motion of the insert with respect to the inner tubular member 260. It should be noted that insert 272, in particular the portion between end 280 and shoulder 284, is received within and extra long along only a fraction of the overall length of the inner tubular member 260.

The insert 272 also includes a concentric longitudinal inner passage 286 which is configured to receive a shaft 274 having a first end extending through the insert 272 and at least partially into the inner cylindrical passage 268 of the inner member 260. An O-ring 287 is disposed concentrically around shaft 274 proximate the first end within the inner member 260. O-ring 287 acts as a spacer between shaft 274 and the inner wall 268 of the inner member 260 and serves to dampen any resonance of shaft 274 produced by vibrations. A second and opposite end of the shaft 274 extends out beyond the end 282 of the insert, where it is securely attached to one end 292 of a coupler or U-joint member 276. In a preferred embodiment, passage 286 of the insert 272 is not cylindrical, but rather has a polygonal cross-section substantially corresponding to the cross-section of the shaft 274. Most preferably, shaft 274 has a hexagonal cross-section of a dimension just slightly less than that of the longitudinal passage 286 and sufficient to permit longitudinal translation of the shaft 274 within the passage 286. The tolerances between the passage 286 and the shaft 274 are on the order of 0.002 inch to substantially reduce any backlash associated with the dimensional differences between the two components yet sufficient to permit translation of the shaft with respect to the insert. The polygonal cross-section of the shaft and the longitudinal passage provides a secure rotational coupling between the shaft 274 and the insert 272 and substantially reduces the risk of slippage.

The length of shaft 274 may vary between substantially equal to the length of outer tubular member 234 or a fraction thereof In a preferred embodiment, the length of shaft 274 is substantially equal to the distance between end 241 of tubular member 234 and the crenulation area 210. With the end of the shaft 274 received or extending through insert 272, a travel distance about equal to the length of the outer tubular member 234 is provided if the shaft encounters compressive forces. The substantially rigid placement of the inner tube of the member 260 with respect to the outer tube of the member 234 and the secure attachment of the insert 272 within the inner tube of the member 260, results in shaft 274 having substantial lateral rigidity and stability.

Extending transversely entirely through at least the outer tubular member 234 and the inner tubular member 260 is a pin 295. In a preferred embodiment, the pin extends through the concentric members at a point near the crenulations 210 and the first end 262 of the inner tubular member. That is to say that the pin should be located at a point as close to the crenulations 210 as possible in order to permit the greatest travel distance for the shaft 274. The pin 295 extends through holes 294B and 294B in the respective members which have diameters substantially greater than the shaft 296 of the pin. Tapered heads and washers center the pin within the holes to prevent abrasion or wear on the pin shaft. The safety pin 295 is provided to ensure the transfer of rotational forces from the shaft through the inner tubular member to the outer tubular member in the event that the resilient member or members become detached with respect to either the inner tubular member or the outer tubular member.

In operation the intermediate shaft 220 is located in the steering column assembly with U-joint 242 attached to the lower portion of the steering column assembly 222 and the coupler 276 interconnecting the upper end of the intermediate shaft assembly to the steering column 222. The telescopic action of the shaft 274 permits easy and quick adjustment of the intermediate shaft assembly to substantially fit or accommodate any gap or variation in the distance between the upper and lower portions of the steering column. Rotational action of the steering wheel is transmitted to the coupler 276 attached to the end of shaft 274, which in turn imparts rotational energy to the insert fixed at the end of the inner tubular member 260. As a result of the substantially rigid and responsive coupling of the inner tubular member to the outer tubular member by way of the resilient members 250, the rotational action imparted to the inner tubular member is transferred to the outer tubular member 234 and the coupler 242. Any road or engine vibrations transmitted up through the steering column are substantially removed or prevented from being transferred to the inner tubular column 260 by the resilient members 250. In the event that the vehicle is involved in a collision, any impact or compressive forces experienced by the intermediate column 220 are absorbed in the telescoping action of the shaft with respect to the inner and outer tubular members 260, 234. In instances where the collision energy exceeds a certain threshold and impacts the intermediate column after collapse of the shaft, the outer tubular member fails at the crenulated portion 210 to interrupt the connection between the lower portion of the steering column assembly to the intermediate shaft and, in essence, break the physical structure responsible for the transfer of that destructive energy. The telescoping nature of the intermediate column, when combined with the crumple zone produced by the crenulated portion 210, substantially and significantly reduces the risk of injury to the vehicle operator as a result of the collision with the steering wheel.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The embodiments of the invention in which an exclusive property or privilege is claimed are defined as follows:

1. An intermediate shaft assembly for a steering column, comprising in combination:

an outer tube having an outer wall and an inner wall defining a first and second ends;

at least one resilient tube concentrically disposed within and immediately adjacent said inner wall of said outer tube, said at least one resilient tube having an outer wall and an inner wall extending between first and second ends;

an inner tube having a first end concentrically disposed within said inner wall of said at least one resilient tube and having a second end extending from said second end of said outer tube, said inner tube having an outer wall and an inner wall; and a telescoping shaft assembly concentrically disposed within said inner tube, said telescoping shaft assembly including a tubular insert disposed within said inner wall of said inner tube and attached to said second end of said inner tube, said tubular insert having a polygonal longitudinal axial passage, and a shaft slidably received within said polygonal longitudinal axial passage and rotationally fixed therein.

2. The intermediate shaft assembly as defined in claim 1, wherein said outer wall of said at least one resilient tube has an outside diameter greater than an inside diameter of said inner wall of said outer tube, and an inside diameter of said inner wall of said at least one resilient tube is less than an outside diameter of said inner tube outer wall.

3. The intermediate shaft assembly as defined in claim 1, wherein said at least one resilient tube includes a plurality of resilient tube elements tandemly arranged within said outer tube.

4. The intermediate shaft assembly as defined in claim 1, further including a pin extending transversely through a hole in at least said outer tube and said inner tube.

5. The intermediate shaft assembly as defined in claim 1, further including a mechanical bond of said resilient tube to said inner wall of said outer tube and to said outer wall of said inner tube.

6. The intermediate shaft assembly as defined in claim 1, wherein said resilient tube has a durometer hardness in the range of 50 to 90.

7. The intermediate shaft assembly as defined in claim 1, wherein said outer tube includes a collapsible section intermediate said first and second ends.

8. The intermediate shaft assembly as defined in claim 1, further including a space between each of said resilient tube elements.

9. A steering column assembly, comprising:
    a tubular outer member closed at one end and open at an opposite end;
    at least one tubular resilient member concentrically disposed within and in frictional engagement with an inner wall of said tubular outer member;
    a tubular inner member concentrically disposed within and in frictional engagement with an inner wall of said at least one tubular resilient member, said tubular inner member having one end extending from said open end of said tubular outer member; and
    a telescoping shaft assembly concentrically disposed within said inner member, said telescoping shaft assembly including a tubular insert disposed within said inner wall of said inner member and attached to said second end of said inner member, said tubular insert having a polygonal longitudinal axial passage, and a shaft slidably received within said polygonal longitudinal axial passage and rotationally fixed therein.

10. The steering column assembly as defined in claim 9, wherein said tubular outer member includes a collapsible portion intermediate said one end and said opposite end.

11. A collapsible intermediate shaft assembly for a vehicle steering column, comprising:
    first and second tubular members, each tubular member open at both ends, said first tubular member concentrically disposed within said second tubular member such that said first end of said first tubular member extends from said first end of said second tubular member;
    a plurality of resilient tubular isolator members concentrically disposed within said second tubular member and exterior of said first tubular member for fixing said first tubular member within said second tubular member;
    a tubular insert member at least partially received in said first end of said first tubular member and rigidly attached thereto, an inner passage of said tubular insert member having a polygonal cross-section; and
    a shaft member, having a polygonal cross-section complimentary to said polygonal cross-section of said inner passage, and having a first end received within said inner passage of said tubular insert member and translatable along a longitudinal axis in and out of said first tubular member.

12. The collapsible intermediate shaft as defined in claim 11, further including a pin extending transversely through at least said second end of said first and second tubular members for maintaining said fixed relationship of said first tubular member with respect to said second tubular member.

13. The collapsible intermediate shaft as defined in claim 12, further including said second end of said second tubular member having a crumple zone for shearing said second end of said second tubular member from a remainder of said second tubular member upon a compressive force of predetermined magnitude.

14. The collapsible intermediate shaft as defined in claim 13, further including:
    a first coupler attached to said second end of said second tubular member for coupling the collapsible intermediate shaft to the steering column;
    a second coupler attached to said second end of said shaft for coupling the collapsible intermediate shaft to the steering column; and
    said plurality of resilient tubular members frictionally engaging said first and second tubular members.

15. The collapsible intermediate shaft as defined in claim 14, further including an anti-resonant device concentrically received along said second end of said first tubular member and engaging an inner wall of said second tubular member and centering said second end of said first tubular member within said second tubular member.

16. The collapsible intermediate shaft as defined in claim 15, wherein:
    said first and second tubular members and said plurality of resilient tubular members are right circular cylinders;
    said polygonal inner passage in said insert member is hexagonal; and
    said plurality of resilient tubular members are made from a polymeric material.

17. The collapsible intermediate shaft as defined in claim 15, wherein said first and second tubular members and said plurality of resilient tubular members are right circular cylinders.

18. The collapsible intermediate shaft as defined in claim 15, wherein said polygonal inner passage in said insert member is hexagonal.

19. The collapsible intermediate shaft as defined in claim 15, wherein said plurality of resilient tubular members are made from a polymeric material.

20. The collapsible intermediate shaft as defined in claim 11, further including said second end of said second tubular member having a crumple zone for shearing said second end of said second tubular member from a remainder of said second tubular member upon a compressive force of predetermined magnitude.

21. The collapsible intermediate shaft as defined in claim 11, further including:
   a first coupler attached to said second end of said second tubular member for coupling the collapsible intermediate shaft to the steering column;
   a second coupler attached to said second end of said shaft for coupling the collapsible intermediate shaft to the steering column; and
   said plurality of resilient tubular members frictionally coupled to said first and second tubular members.

22. The collapsible intermediate shaft as defined in claim 11, further including an anti-resonant device concentrically received along said second end of said first tubular member and engaging an inner wall of said second tubular member and centering said second end of said first tubular member within said second tubular member.

23. An intermediate shaft assembly for a steering column, comprising in combination:

an outer tube having an outer wall and an inner wall defining a first and second ends;
   at least one resilient tube concentrically disposed within and immediately adjacent said inner wall of said outer tube, said at least one resilient tube having an outer wall and an inner wall extending between first and second ends;
   an inner tube having a first end concentrically disposed within said inner wall of said at least one resilient tube and having a second end extending from said second end of said outer tube, said inner tube having an outer wall and an inner wall; and
   a telescoping shaft assembly having a first end concentrically disposed within said inner wall of said inner tube intermediate said first and second ends of said outer tube, and rigidly secured to said inner tube, and said shaft assembly having a second end extending from said second end of said inner tube.

\* \* \* \* \*

UNITED STATES PATENT AND TRADEMARK OFFICE
CERTIFICATE OF CORRECTION

PATENT NO. : 5,902,186
DATED : May 11, 1999
INVENTOR(S) : Patrick D. Gaukel

Page 1 of 2

It is certified that error appears in the above-identified patent and that said Letters Patent is hereby corrected as shown below:

Abstract, line 1;
  "is provided" missing after "a steering column assembly"
Column 2, line 3;
  "Shari" should be "shaft"
Column 2, line 38;
  "percent" missing after "40"
Column 4, line 9;
  "LA" missing after "axis"
Column 5, line 24;
  "20" missing after "assembly"
Column 6, line 5;
  "20." missing after "shaft assembly"
Column 6, line 9;
  "." missing after "vibrations"
Column 6, line 10;
  "The amount of adjustment or telescopic translation is preferably the length of shaft 74 up to resonance damper 87 and" should be inserted before "most preferably"
Column 7, line 53;
  "246" should be added before "attached"
Column 7, line 53;
  "246" should be deleted after "294"
Column 8, line 47;
  "254" should be "254"
Column 9, line 16;
  "extra long" should be "extends"
Column 9, line 47;
  "." missing after "thereof"

UNITED STATES PATENT AND TRADEMARK OFFICE
CERTIFICATE OF CORRECTION

PATENT NO. : 5,902,186  
DATED : May 11, 1999  
INVENTOR(S) : Patrick D. Gaukel

Page 2 of 2

It is certified that error appears in the above-identified patent and that said Letters Patent is hereby corrected as shown below:

Column 9, line 66;
  "294B and 294B" should be "294"
Column 10, line 10;
  "," missing after "operation"

Signed and Sealed this

Twenty-fourth Day of April, 2001

Attest:

NICHOLAS P. GODICI

*Attesting Officer*   *Acting Director of the United States Patent and Trademark Office*